(12) United States Patent
McLaughlin

(10) Patent No.: US 11,752,900 B2
(45) Date of Patent: Sep. 12, 2023

(54) CAR SEAT ALARM SYSTEM

(71) Applicant: Wanda McLaughlin, Richmond, VA (US)

(72) Inventor: Wanda McLaughlin, Richmond, VA (US)

( * ) Notice: Subject to any disclaimer, the term of this patent is extended or adjusted under 35 U.S.C. 154(b) by 0 days.

(21) Appl. No.: 16/192,601

(22) Filed: Nov. 15, 2018

(65) Prior Publication Data
US 2019/0168635 A1 Jun. 6, 2019

Related U.S. Application Data

(60) Provisional application No. 62/567,500, filed on Oct. 3, 2017.

(51) Int. Cl.
| | |
|---|---|
| *G08B 21/22* | (2006.01) |
| *G08B 21/24* | (2006.01) |
| *B60K 35/00* | (2006.01) |
| *B60N 2/26* | (2006.01) |
| *B60N 2/28* | (2006.01) |
| *B60N 2/00* | (2006.01) |
| *G08B 21/02* | (2006.01) |
| *B60R 11/02* | (2006.01) |

(52) U.S. Cl.
CPC ........... *B60N 2/002* (2013.01); *G08B 21/025* (2013.01); *G08B 21/0294* (2013.01); *G08B 21/22* (2013.01); *G08B 21/24* (2013.01); *B60K 35/00* (2013.01); *B60N 2/26* (2013.01); *B60R 2011/0294* (2013.01)

(58) Field of Classification Search
CPC ....................................................... G08B 21/22
See application file for complete search history.

(56) References Cited

U.S. PATENT DOCUMENTS

| | | | |
|---|---|---|---|
| 7,009,522 B2 | 3/2006 | Flanagan | |
| 9,637,053 B2 | 5/2017 | Schofield | |
| 2014/0184404 A1* | 7/2014 | Schoenberg | B60N 2/002 340/457 |
| 2014/0253314 A1* | 9/2014 | Rambadt | B60N 2/002 340/457.1 |
| 2015/0228172 A1* | 8/2015 | DeZur—Ahola | B60N 2/002 340/522 |
| 2017/0101055 A1* | 4/2017 | Alfaro Fonseca | B60N 2/002 |
| 2017/0129399 A1* | 5/2017 | Appukutty | B60Q 9/00 |

\* cited by examiner

*Primary Examiner* — Joseph H Feild
*Assistant Examiner* — Pameshanand Mahase
(74) *Attorney, Agent, or Firm* — Michael C. Balaguy

(57) ABSTRACT

A car seat alarm system including a weight-sensor plate assembly, a power source, a dashboard sensor, and a portable device including a speaker. The weight-sensor plate assembly is positioned and configured to detect a weight of a child in a car seat. The weight-sensor plate assembly is in communication with the dashboard sensor including a transceiver. The dashboard or visor sensor is configured to communicate that a child is present within the car seat. The dashboard sensor is in wireless communication with the portable device such as a key fob or smartphone. The dashboard sensor is configured to activate an alarm through the speaker when the portable device extends past a predetermined proximity range from the dashboard sensor is reached and if the weight of the child is present within the car seat.

20 Claims, 5 Drawing Sheets

CAR SEAT ALARM SYSTEM

CROSS REFERENCE TO RELATED APPLICATION

The present application is related to and claims priority to U.S. Provisional Patent Application No. 62/567,500 filed Oct. 3, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of safety systems and more specifically relates to an alarm system.

2. Description of Related Art

Child safety seats are seats designed specifically to protect children from injury or death during collisions. Car manufacturers may integrate child safety seats directly into their vehicle's design. Most commonly, these seats are purchased and installed by consumers. Many regions require children defined by age, weight, and/or height to use a government-approved child safety seat when riding in a vehicle. Child safety seats provide passive restraints and must be properly used to be effective.

Parents and caregivers can become distracted and can forget that children are in the backseat, especially if the child falls asleep or is otherwise quiet. Unfortunately, if parents or caregivers exit the car without remembering to remove the child, the child can suffer a number of health conditions, possibly even death. The interior of a vehicle is capable of heating up or cooling down quickly, which leaves a child vulnerable to both hyperthermia and hypothermia. In addition, an unattended child is also at risk of being kidnapped. A suitable solution is desired.

U.S. Pat. No. 7,009,522 to Stephen R. Flanagan relates to an object-proximity monitoring and alarm system. The described object-proximity monitoring and alarm system includes a weight-sensitive mat or other sensor determines whether a child seat in a vehicle is occupied, a transmitter is proximate to the sensor, and a keychain fob or other portable unit includes a receiver and an alarm. Generally, if the child seat is occupied and the keychain fob is removed from proximity to the transmitter, the transmitter communicates this to the keychain fob receiver and the alarm is activated. Exemplary embodiments include an add-on kit including a base unit with a transceiver for use with existing car seats having a base and a detachable shell, an add-on kit without the base unit for use with existing unitary car seats, a car seat with the child sensor, transmitter, and/or base unit built into it, and an automatic checklist feature for diaper bags, strollers, etc.

BRIEF SUMMARY OF THE INVENTION

In view of the foregoing disadvantages inherent in the known safety systems art, the present disclosure provides a novel car seat alarm system. The general purpose of the present disclosure, which will be described subsequently in greater detail, is to provide an effective safety system for preventing children from being left unattended in a vehicle.

A car seat alarm system is disclosed herein. The car seat alarm system includes a weight-sensor plate assembly, a power source, a dashboard sensor, and a portable device including a speaker. The weight-sensor plate assembly is positioned underneath a car seat and configured to detect a weight of a child in the car seat. The weight-sensor plate assembly includes a weight-sensor plate within a housing. The housing is a cushioned fabric for concealing the weight-sensor plate.

The weight-sensor plate assembly is in communication with the dashboard sensor including a transceiver. the dashboard sensor is configured to communicate that the weight of the child is present within the car seat. The dashboard sensor is in wireless communication with the portable device having a receiver. The dashboard sensor is mountable within a vehicle. The dashboard sensor is configured to activate an alarm through the speaker when the portable device extends past a pre-determined proximity range from the dashboard sensor is reached and if the weight of the child is present within the car seat. The alarm is deactivated when pressure is removed from the weight-sensor plate assembly. The car seat alarm system is further configured to communicate with a mobile application hosted on the smartphone and configured to provide alerts through the mobile application for viewing on a mobile display.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a car seat alarm system, constructed and operative according to the teachings of the present disclosure.

DETAILED DESCRIPTION

As discussed above, embodiments of the present disclosure relate to a safety system and more particularly to a car seat alarm system as used to provides an alert to prevent children from being left unattended in a vehicle.

Generally, the car seat alarm system is designed to increase the likelihood of survival for an infant or child in the backseat of a vehicle. The invention is comprised of a weighted sensor, key fob, a dashboard sensor, and an app for a mobile phone. The weighted pressure plate is transferable to any car seat for infants or children. Using Bluetooth technology, the weighted pressure plate, which is concealed in a cushioned fabric, is able to communicate to the dashboard/visor sensor that weight is present. The visor and key fob communicate via Bluetooth that the proximity has been reached and will sound the alarm. The optional app for the mobile phone will also alert the driver that the child is still in the backseat (weight is present). The key fob includes a speaker on the back for sounding an alert. The alert may sound until the child is removed from the seat and therefore the pressure sensor. This further prevents children from being left unattended in a vehicle, reducing the risk of injuries and fatalities. The present invention assists parents and caretakers in remembering to remove a child from the backseat of a vehicle.

Figure 1:
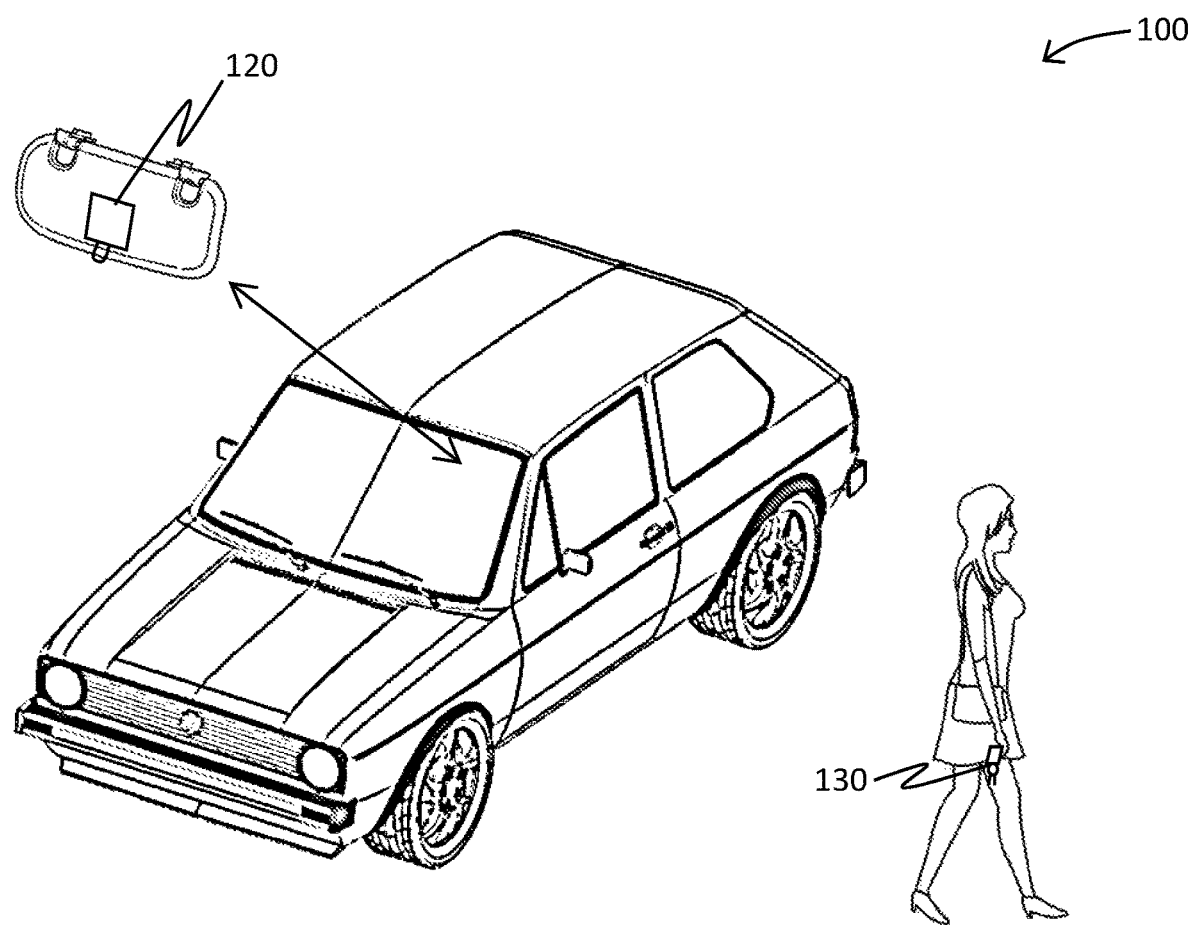
FIG. 1 is a perspective view of the car seat alarm system during an 'in-use' condition, according to an embodiment of the disclosure.

Referring now more specifically to the drawings by numerals of reference, there is shown in FIGS. 1-5, various views of a car seat alarm system 100. FIG. 1 shows a car seat alarm system 100 during an 'in-use' condition 150, according to an embodiment of the present disclosure. As illustrated, the car seat alarm system 100 may include a weight-sensor plate assembly 110, a power source 112, a dashboard sensor 120, and a portable device including a speaker 132. The weight-sensor plate assembly 110 is positioned and configured to detect a weight of a child in a car seat 10. The weight-sensor plate assembly 110 is in communication with the dashboard sensor 120 including a transceiver. The dashboard sensor 120 is configured to communicate that the weight of the child is present within the car seat 10. The dashboard sensor 120 is in wireless communication with the portable device 130 having a receiver. The dashboard sensor 120 is configured to activate an alarm to be outputted through the speaker 132 when the portable device 130 extends past a pre-determined proximity range from the dashboard sensor 120 is reached and if the weight of the child is present within the car seat 10. The portable device 130 includes a key fob 134.

Figure 2:
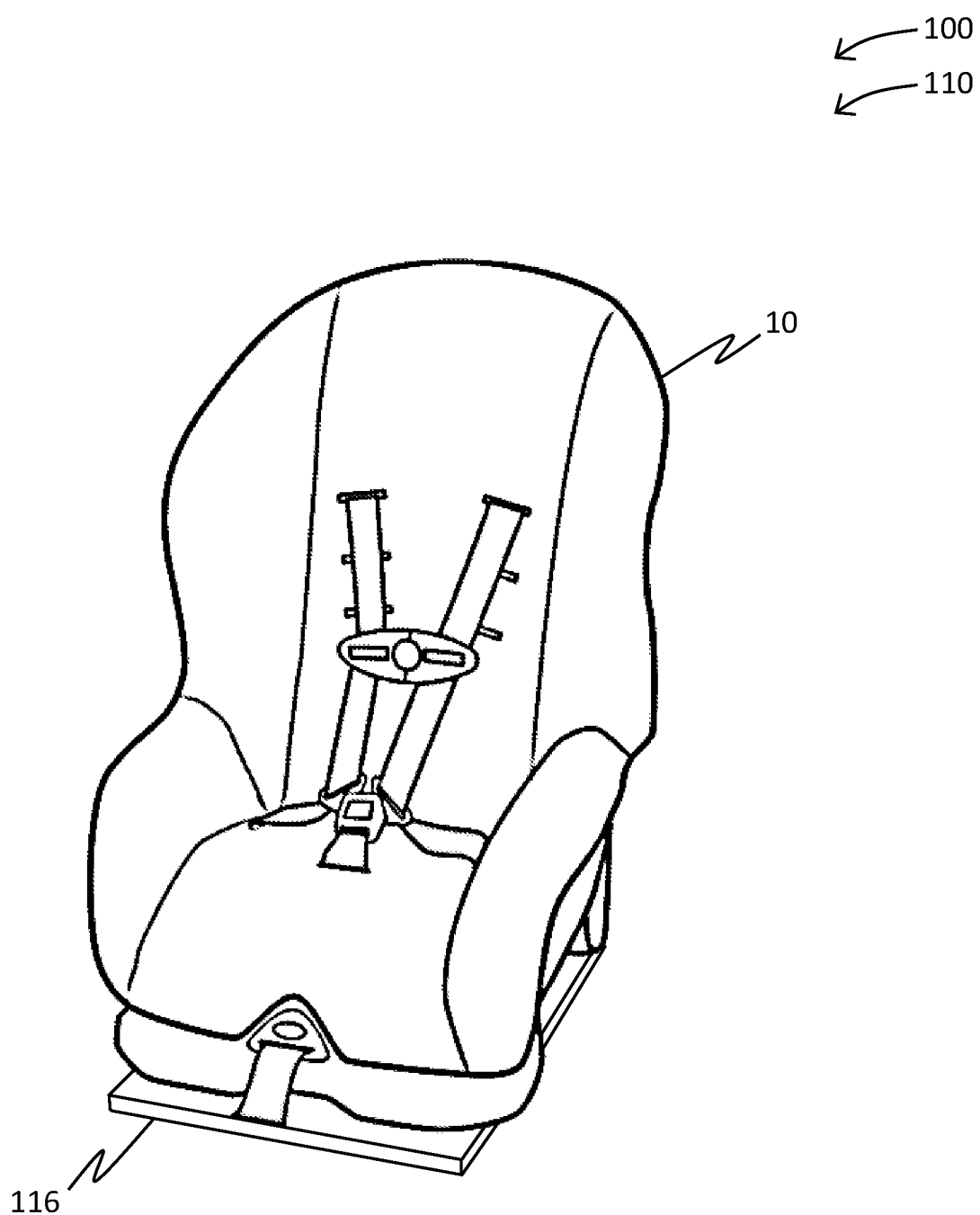
FIG. 2 is a perspective view of the car seat alarm system of FIG. 1, according to an embodiment of the present disclosure.

FIG. 2 shows a perspective view of the car seat alarm system 100 of FIG. 1, according to an embodiment of the present disclosure. As above, the car seat alarm system 100 may include the weight-sensor plate assembly 110, the power source 112, the dashboard sensor 120, and the portable device 130 including the speaker 132. The weight-sensor plate assembly 110 includes a weight-sensor plate 114 within a housing 116. The weight-sensor plate 114 is pressure sensitive such that when a child is sitting in a car seat 10, the weight is registered. The weight-sensor plate assembly 110 is portable and transferable allowing a user to use the device with different car seats 10. The housing 116 is a cushioned fabric for concealing the weight-sensor plate 114. The power source 112 is internally housed within the housing 116 and electronically coupled to the weight-sensor plate 114. The weight-sensor plate assembly 110 is in communication with the dashboard sensor 120 via a wireless network (Bluetooth®). The dashboard sensor 120 is in wireless communication with the key fob 134 via a wireless network (Bluetooth®).

Figure 3:
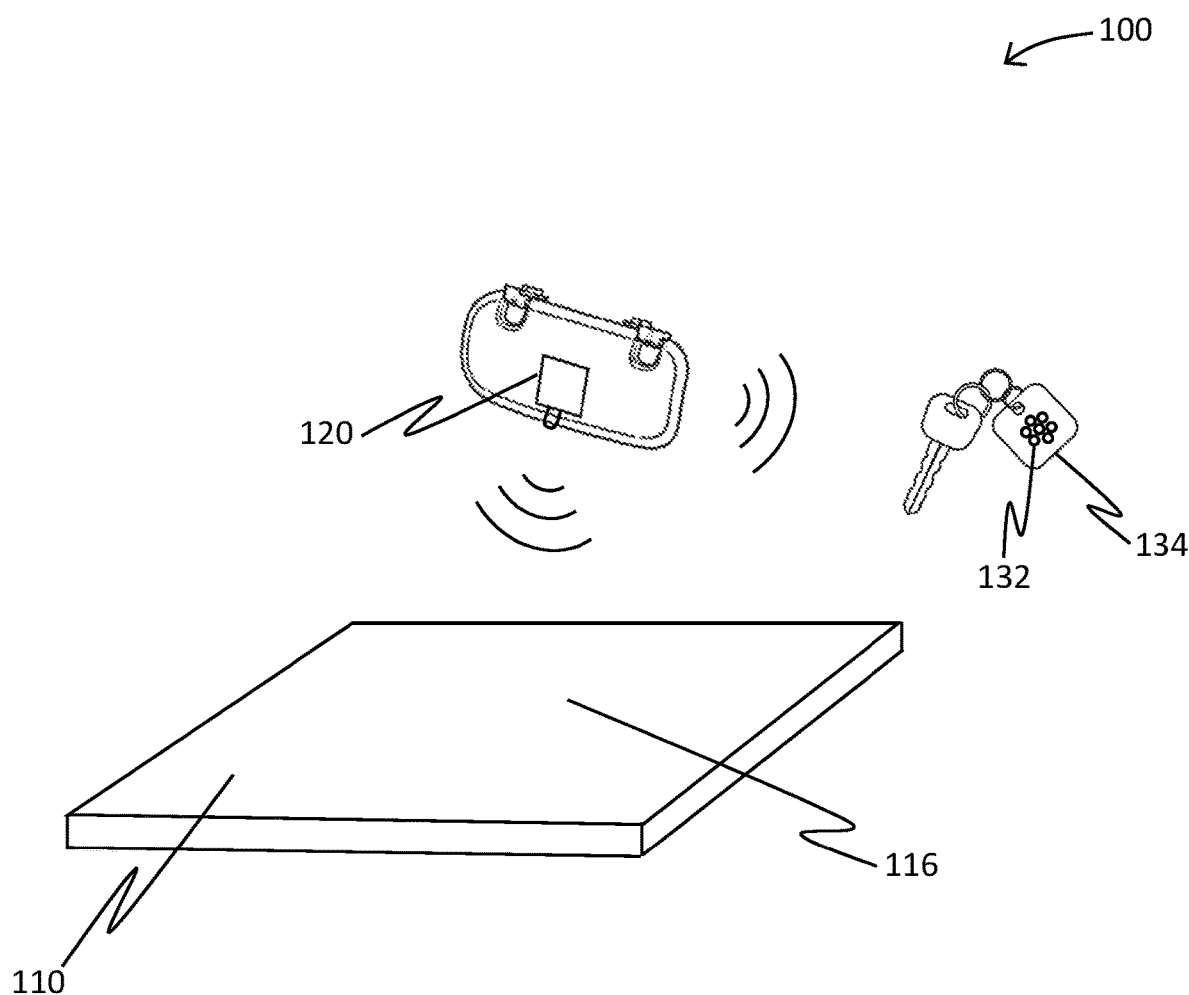
FIG. 3 is a perspective view of the car seat alarm system of FIG. 1, according to an embodiment of the present disclosure.

FIG. 3 shows a perspective view of the car seat alarm system 100 of FIG. 1, according to an embodiment of the present disclosure. As above, the car seat alarm system 100 may include the weight-sensor plate assembly 110 in communication with the dashboard sensor 120 and the dashboard sensor 120 in wireless communication with the key fob 134 via a wireless network. If a child is left unattended in the car seat, the system 100 is configured to alert a parent with an alarm or other visual or audible alert. The alarm is deactivated when pressure is removed from the weight-sensor plate assembly 110. In certain embodiments, the portable device further includes a smartphone. The car seat alarm system 100 is further in communication with a mobile application hosted on the smartphone and configured to provide alerts through the mobile application for viewing on a mobile display.

Figure 4:
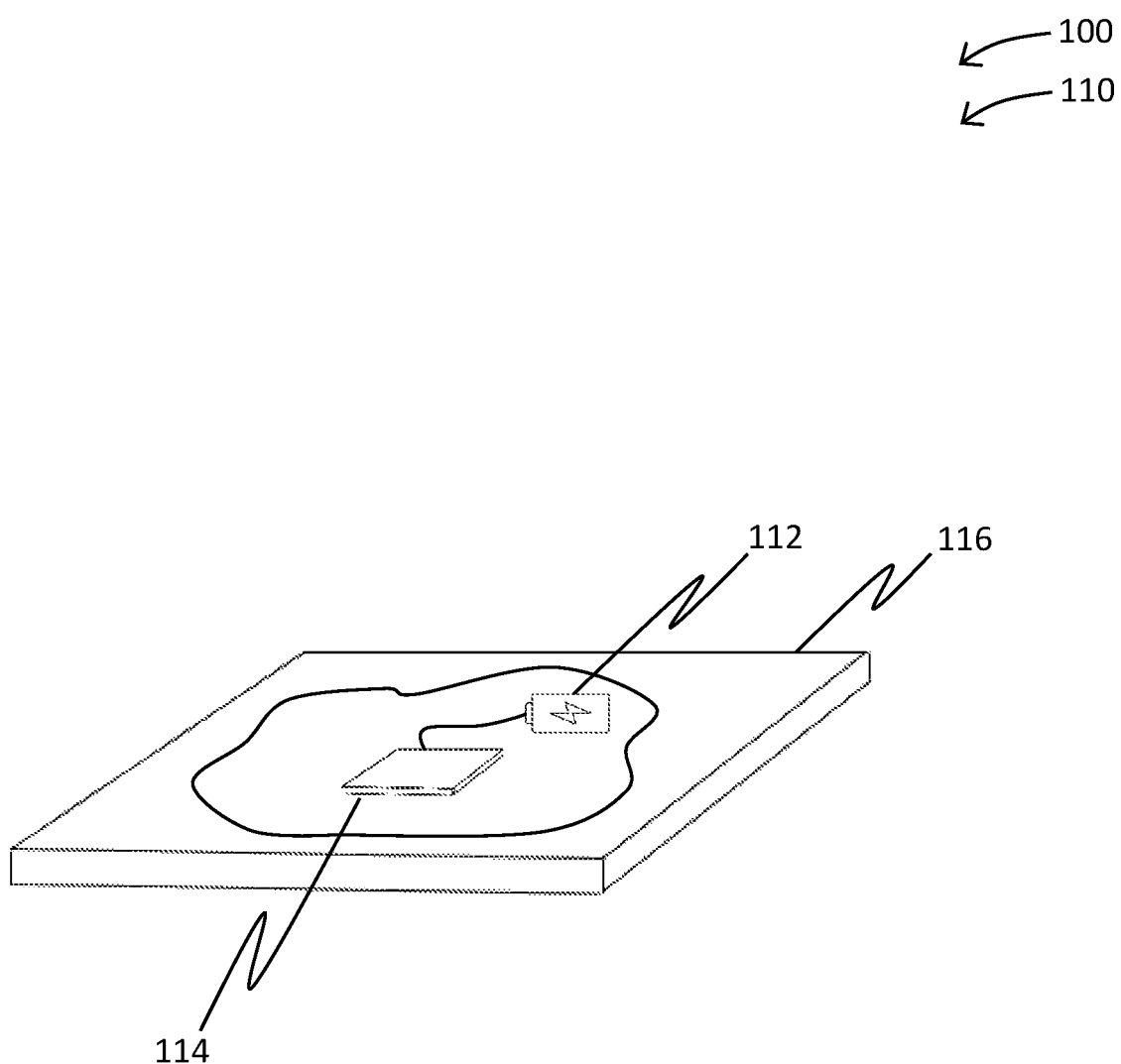
FIG. 4 is a perspective view of the car seat alarm system of FIG. 1, according to an embodiment of the present disclosure.

FIG. 4 shows a perspective view of the car seat alarm system 100 of FIG. 1, according to an embodiment of the present disclosure. As above, the car seat alarm system 100 may include the weight-sensor plate assembly 110, the power source 112, the dashboard sensor 120, and the portable device 130 including the speaker 132 in combination to provide a safety alert device. The weight-sensor plate assembly 110 is substantially planar. The weight-sensor plate assembly 110 is preferably positioned underneath the car seat 10 to detect the weight of a child in the car seat 10. The weight-sensor plate assembly 110 comprises a width approximately equal to a width of a seat portion of the car seat 10.

Figure 5:
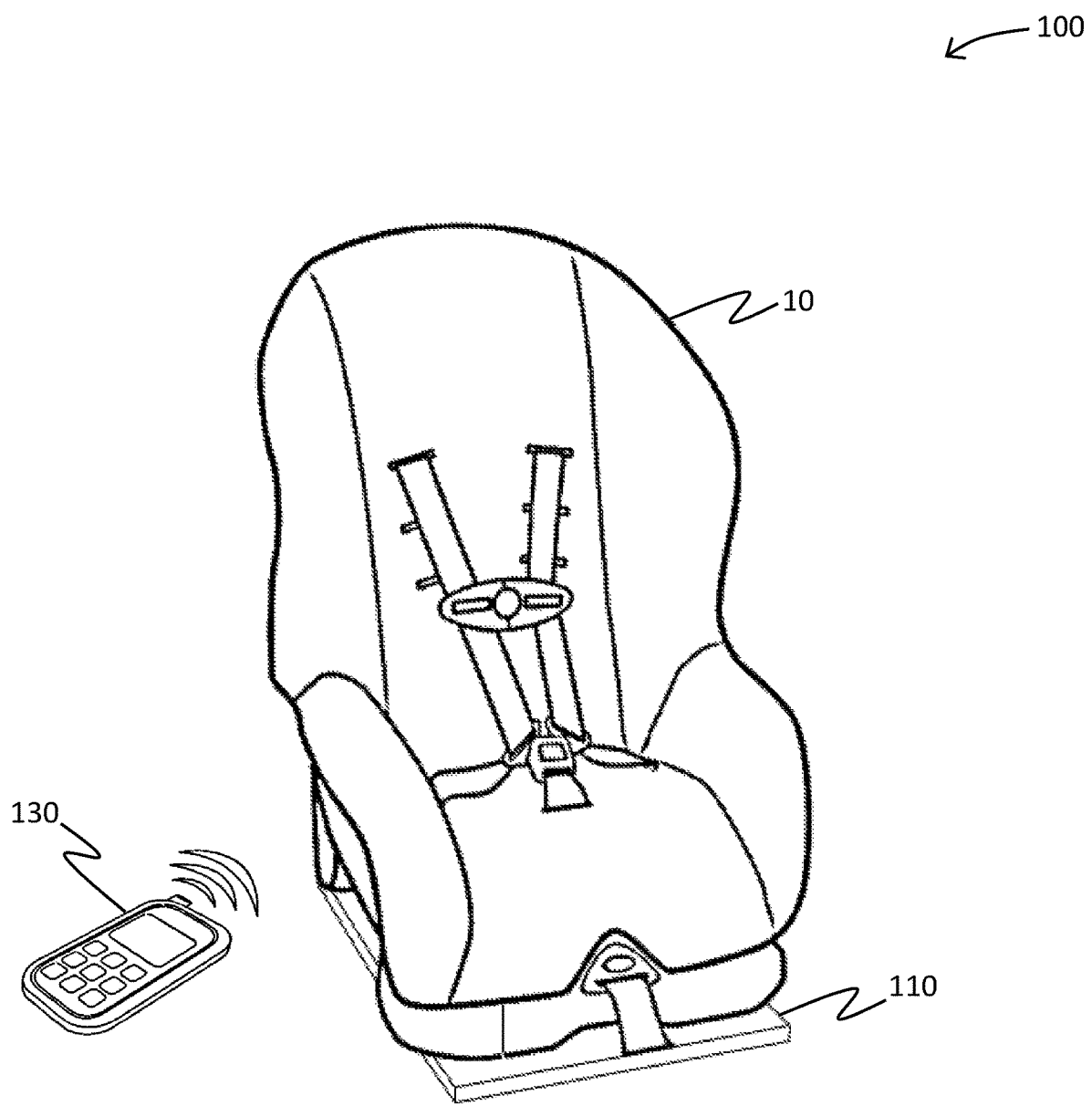
FIG. 5 is a perspective view of the car seat alarm system of FIG. 1, according to an embodiment of the present disclosure.

FIG. 5 shows a perspective view of the car seat alarm system 100 of FIG. 1, according to an embodiment of the present disclosure. As above, the car seat alarm system 100 may include the weight-sensor plate assembly 110, the dashboard sensor 120 and the portable device 130 such as a key fob 134 in communication with each other via a wireless network. The dashboard sensor 120 is mountable within a vehicle. The dashboard sensor 120 includes a clip for mounting the dashboard sensor 120. The dashboard sensor 120 may be applied to a vehicle sun visor. The dashboard sensor 120 is configured to activate an alarm to be relayed through the speaker 132 when the portable device 130 extends past a pre-determined proximity range from the dashboard sensor 120 is reached and if the weight of the child is present within the car seat 10. In a preferred embodiment, the pre-determined proximity range is approximately greater than 10 feet.

It should also be noted that, under appropriate circumstances, considering such issues as design preference, user preferences, marketing preferences, cost, structural requirements, available materials, technological advances, etc., are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or

What is claimed is new and desired to be protected by Letters Patent is set forth in the appended claims:

1. A car seat alarm system comprising:
   a weight-sensor plate assembly;
   a power source;
   a dashboard sensor; and
   a portable device including; a speaker;
   wherein said weight-sensor plate assembly is positioned and configured to detect a weight of a child in a car seat;
   wherein said weight-sensor plate assembly is in communication with said dashboard sensor including a transceiver, said dashboard sensor is configured to communicate that said weight of said child is present within said car seat; and
   wherein said dashboard sensor is in wireless communication with said portable device having a receiver; said dashboard sensor is configured to activate an alarm through said speaker when said portable device extends past a pre-determined proximity range from said dashboard sensor is reached and if said weight of said child is present within said car seat;
   wherein said dashboard sensor is configured to communicate to said receiver that said weight of said child is present within said car seat.

2. The car seat alarm system of claim 1, wherein said weight-sensor plate assembly includes a weight-sensor plate within a housing.

3. The car seat alarm system of claim 2, wherein said weight-sensor plate is pressure sensitive.

4. The car seat alarm system of claim 2, wherein said weight-sensor plate assembly is portable and transferable.

5. The car seat alarm system of claim 4, wherein said housing is a cushioned fabric for concealing said weight-sensor plate.

6. The car seat alarm system of claim 4, wherein said power source is internally housed within said housing.

7. The car seat alarm system of claim 6, wherein said power source is electronically coupled to said weight-sensor plate.

8. The car seat alarm system of claim 7, wherein said weight-sensor plate assembly is substantially planar.

9. The car seat alarm system of claim 8, wherein said weight-sensor plate assembly is positioned underneath said car seat to detect said weight of a child in said car seat.

10. The car seat alarm system of claim 9, wherein said weight-sensor plate assembly comprises a width approximately equal to a width of a seat portion of said car seat.

11. The car seat alarm system of claim 1, wherein said weight-sensor plate assembly is in communication with said dashboard sensor via a wireless network.

12. The car seat alarm system of claim 11, wherein said dashboard sensor is in wireless communication with a key fob via a wireless network.

13. The car seat alarm system of claim 1, wherein said portable device includes a key fob.

14. The car seat alarm system of claim 13, wherein said alarm is deactivated when pressure is removed from said weight-sensor plate assembly.

15. The car seat alarm system of claim 1, wherein said portable device further includes a smartphone.

16. The car seat alarm system of claim 15, is further in communication with a mobile application hosted on said smartphone and configured to provide alerts through said mobile application for viewing on a mobile display.

17. The car seat alarm system of claim 1, wherein said dashboard sensor is mountable within a vehicle.

18. The car seat alarm system of claim 17, wherein said dashboard sensor includes a clip for mounting said dashboard sensor.

19. The car seat alarm system of claim 1, wherein said pre-determined proximity range is greater than 10 feet.

20. The car seat alarm of claim 1, wherein the pre-determined proximity range is measured by communication between the dashboard sensor and the receiver.

* * * * *